United States Patent Office 2,769,800
Patented Nov. 6, 1956

2,769,800

POLYAMINE MODIFIED MELAMINE-FORMALDE-HYDE RESINS

Tzeng Jiueq Suen, New Canaan, and Yun Jen, Stamford, Conn., assignors to American Cyanamid Company, New York, N. Y., a corporation of Maine No Drawing. Application July 6, 1955,
Serial No. 520,358

12 Claims. (Cl. 260—67.6)

This invention relates to resinous compositions and to the process for preparing the same. More particularly, this invention relates to the production of resinous compositions which comprise reacting melamine, formaldehyde and a polyfunctional aliphatic polyamine.

Melamine-formaldehyde resinous compositions are well known in the art. Resinous compositions comprising solely melamine and formaldehyde, as well as those compositions containing melamine, formaldehyde and a modifying component, find many uses. The use of melamine resins in making a wet strength paper has been known for a number of years. One of the usual practices when utilizing these resins as wet strength promoters is to dissolve the melamine-formaldehyde resin in a dilute hydrochloric acid solution and age it for a certain length of time. During this period, the resin is further polymerized; and the so-called acid colloid is formed. The acid colloid is infinitely water-soluble and is a very effective beater additive for paper. However, it is not stable and must be prepared by this aging process just prior to use. Besides the acid colloids, other forms of water-soluble melamine resins are known; for instance, methylated polymethylol melamine and bisulfite modified melamine-formaldehyde resin. The methylated product is non-ionic, has a low degree of polymerization and is not generally effective as a beater additive, although it finds other uses in such applications, as in textile treatment and laminating processes. The anionic bisulfite modified product, while far inferior to the acid colloid, does find some use in making wet strength paper.

In our parent application Serial No. 343,791, filed March 20, 1953, it was disclosed that stable, cationic, water-soluble but highly polymerized products are obtainable by reacting melamine, formaldehyde and a water-soluble polyfunctional aliphatic polyamine in the presence of an acid. These products can be added directly to the pulp stock as an efficient wet strengthening agent for paper through beater addition. The resinous composition prepared can also be used in textile treatment and in leather treatment. Other possible uses are in water-soluble adhesives and as an insoluble agent to starch.

In the parent application it was stated that in the preparation of the resinous material, the order of addition of reactants is not important. For instance, melamine and formaldehyde may be condensed first at a near neutral or slightly alkaline pH. Thereafter, the modifier may be added and the mixture subsequently acidified to expedite polymerization which is found to proceed more rapidly in an acid medium. As soon as the desired degree of polymerization is reached, the polymerization reaction may be halted by neutralization of the reaction mixture. Alternately, the modifier may be first reacted with formaldehyde, then melamine charged into the reaction mixture. Still another way of preparation is to charge melamine, formaldehyde and the modifier all together, maintain the pH in the order of from about 4.5 to about 6.5 and the polymerization carried out to the desired end. The end point of the polymerization has been found best controlled by viscosity measurement of the resin syrup. At 35% resin solids, a minimum viscosity of 20 centipoises measured at 25° C. must be reached before the reaction is stopped. There is no upper viscosity limit to which the resin should be polymerized, but for practical purposes a viscosity at 25° C. significantly above 800 centipoises at 35% solids has been found to unduly shorten the storage life of the resin. The preferred viscosity range of the finished syrup measured at 25° C. and at 35% solids is from about 30 to about 500 centipoises. It was further disclosed in the parent application that the reactant could be added in portions at different points of reaction; for example, a part of formaldehyde could be first reacted with melamine, the modifier charged, and the remaining formaldehyde added after the reaction mass has been highly polymerized.

We have now found that certain distinctive advantages are obtained when the polyfunctional aliphatic polyamine is added to the reaction product of melamine-formaldehyde when the latter is only partially polymerized. In the reaction of melamine with formaldehyde, the tendency where there is present an excess of formaldehyde unless the reaction is carefully controlled, is to form intermediate polymethylol melamines. These polymethylol derivatives though completely soluble in 0° C. water immediately after their formation, tend to crystallize out rapidly even at elevated temperature. The disadvantage of this crystallization is that it seriously interferes with the reaction, and to a substantial degree, minimizes the yield of the soluble condensation polymerization product. By adding the polyfunctional aliphatic polyamine to the melamine-formaldehyde syrup at a stage when less than the theoretical maximum amount of formaldehyde is present and when only partial polymerization has been permitted to take place, these consequences may be avoided.

The partially polymerized melamine-formaldehyde syrup which is treated with a polyfunctional aliphatic polyamine according to the practice of the present invention, may be obtained commercially; or it may be prepared, as hereinafter more fully described, by reacting less than the theoretical maximum molar combining ratio of formaldehyde with melamine of 6:1, respectively.

It is, accordingly, an object of the present invention to provide an improved method for making a cationic water-soluble resinous material by treating a partially polymerized melamine-formaldehyde resin with a polyfunctional aliphatic polyamine. It is a further object of the present invention to provide a method of making a water-soluble melamine-formaldehyde resinous material by treating with a polyfunctional aliphatic polyamine and formaldehyde, a partially polymerized melamine-formaldehyde resin obtained by reacting melamine with less than the maximum theoretical molar ratio of formaldehyde until a point is reached where the material has reacted beyond the methylol state, but not beyond a point just short of the gel stage. These and other objects of our invention will be discussed more fully hereinbelow.

Melamine reacts readily with formaldehyde in neutral aqueous solutions in all molar proportions between 1:1 to 1:6 melamine to formaldehyde, respectively. In the cold, methylol condensation products form by prolonged action; these methylol compounds at suitable concentration may separate from the solution in crystalline form. At higher temperatures, the methylol compounds are formed in a shorter time; for example boiling for some minutes and cooling to separate the compound. By the further action of heat, further condensation occurs with rapid formation of hydrophilic and then hydrophobic resins. By still further heating, there is finally formed the gummy phase, followed by hardening to an insoluble polymerization product. Correspondingly, with the desired condensation product the reaction may be interrupted at any phase of the condensation and the product separated in a known manner as by filtration, evaporation, precipitation, decantation, drying (spray or otherwise), or the like.

It has been found that reactions between melamine and formaldehyde can be very conveniently and advantageously carried out without the disadvantages of insoluble formation, etc., discussed above by a first stage reaction of melamine and formaldehyde in a ratio of 1:1.5 to 1:5, preferably 1:2 to 1:4, to form a partially polymerized melamine-formaldehyde condensation product, carrying the reaction to a point beyond the methylol stage but short of the gel stage and thereafter adding a polyfunctional aliphatic polyamine and additional amounts of formaldehyde in a second stage reaction. The methylol stage will be understood as that point prior to polymerization where monomeric methylol melamines only are present, i. e., melamines containing from 1–6 methylol ($—CH_2OH$) groups.

The stage of partial polymerization will be understood as that stage, before the gel point is reached, where there are present both monomeric and polymerized methylol melamines and where the reacting material is soluble when diluted with aqueous formaldehyde. The resinous reacting syrup has the proper characteristics when it is polymerized in part but not beyond the point where one part by volume of the syrup is insoluble or forms a precipitate with an equal volume of 37% aqueous formaldehyde at 60° C. In other words, the partially polymerized range of the instant invention is that within which the reacting syrup is beyond the methylol stage; and the condensation product is hydrophilic with an equal part of 37% aqueous formaldehyde at a temperature of 60° C. or lower but not beyond the point where the syrup is hydrophobic at 60° C.

It will be understood that "hydrophobic" or "hydrophobe" as herein employed refers to that property of the syrup where it begins to become insoluble in water. Zero-degree hydrophobe specifies the condition of the resin when it exhibits this hydrophobe property in water of 0° C. The hydrophobe stage is readily apparent by the immediate formation of a white precipitate when a portion of the resinous reacting composition is placed into water.

The gel point will, thus, be understood as that stage in condensation where complete miscibility of the polymerized material with aqueous formaldehyde in ordinarily commercially available strengths of approximately 37% concentration and 60° C. would not as a practical matter be possible due to the advanced polymerization of the reacted mass. The extent of this partial polymerization may be easily detected by testing the solubility of the resin in water of varying temperatures. Generally, although not necessarily, it is tested at a temperature lower than the melamine-formaldehyde reacting mixture. We have found it preferable to test for hydrophobe in 0° C. water, although testing even at lower temperatures, as in salt solutions, is possible in ascertaining the point when some of the methylol melamines begin to polymerize. After partially polymerized material is ascertained as being in this condition, i. e., beyond the methylol stage but not beyond the 60° hydrophobe point, the polyamine and more formaldehyde are introduced in a second stage and further polymerization is carried out at an acidic pH, or at high temperatures or both to the desired viscosity. The rate of addition of the subsequent portion of formaldehyde is not critical, it being only necessary that between 6 and 14 mols of formaldehyde per mol of melamine be present prior to the end point of the reaction.

The addition of greater amounts than 14 mols of formaldehyde at this stage has been found to slow down proportionately the condensation-polymerization reaction with much the same effect that occurs when neutralizing with sodium hydroxide. Under ordinary operating conditions, a ratio of more than 14 mols of formaldehyde per mol of melamine will generally retard the reaction rate to a point where polymerization at greater concentration is not advisable. Accordingly, the formaldehyde to melamine ratio in the composition is generally not permitted to exceed 14:1 during this second stage prior to the end point of the polymerization, i. e., the point where the viscosity of the reaction product measured at 35% solids and 25° C. falls within the range of about 20–800 centipoises.

The polymerization of the partially polymerized melamine-formaldehyde resin may be performed in the presence of a part or all of the polyalkylene polyamine. Generally, the lower the pH of the reaction mixture, the faster is the rate of reaction. We have found that the reaction during the first stage can be carried out at a pH range from about 1 to about 11, with the preferred range being from 6 to 10. The most suitable pH, however, depends on the particular modifying compositions used. Generally, because of the retarding effect with a greater amount of formaldehyde, a lower pH should be used proportionately with increased amounts of formaldehyde. With the polyfunctional aliphatic polyamine in the reacting mass, a lower pH may be used.

When the reaction is carried out in the second stage at a ratio of 6 mols or less of formaldehye per mol of melamine, the reaction will proceed very rapidly; and the control of the polymerization reaction will be difficult. It is desirable, therefore, to keep the molar ratio of formaldehyde to melamine above 6 but below 14 during the polymerization at acidic pH. As soon as the end point is reached, as determined by viscosity measurements, the polymerization reaction can be terminated either by cooling or by neutralizing to a pH of about 7, as with sodium hydroxide, amines, etc., and/or by diluting with water and formaldehyde. Neutralization of the composition is preferably employed to stop further polymerization at the end point.

Temperature of reaction may be in the range from room temperature to the reflux temperature of the mix. If an autoclave is used in carrying out the reaction, even higher temperatures may be employed. The preferred temperature range is from about 20° C. to about 100° C. at atmospheric pressure. After the end point in the polymerization, additional amounts of formaldehyde (providing at least 8 mols per mol of melamine are present) limited only by practical considerations, but preferably between 8 and 30 mols per mol of melamine may be added in a third stage either before, during, or after the neutralization step. This final portion of formaldehyde is utilized to lend greater stability to the resinous composition.

In order that the present invention may be more fully understood, the following examples are set forth for purposes of illustration only, and any specific enumeration of details should not be interpreted as a limitation except as expressed in the appended claims. All parts used are parts by weight.

EXAMPLE 1

152 parts of 37% aqueous formaldehyde is reacted with 72.2 parts of melamine at a pH of 7.2 and at 90° C. After 40 minutes reaction, the system begins to exhibit hydrophobe in water at 0° C. (white streaks of precipitate form when a portion is placed in ice water; a sample tested at this stage is completely soluble when diluted with an equal volume of 37% formaldehyde at 60° C.). A second portion of 37% aqueous formaldehyde is promptly introduced in an amount of 311.2 parts. To this mixture 34.3 parts of 3,3'-iminobispropylamine is added, followed by 28.1 parts of 32% hydrochloric acid. Polymerization proceeds smoothly at a pH of 4.2 and at a temperature of 55° C. When the viscosity of the system reaches "U" on the Gardner-Holdt scale, the resin is neutralized to a pH of 7.0 with 2% sodium hydroxide solution. A third portion of 37% formaldehyde (371.0 parts) is then added. The resin syrup is clear and almost colorless; it is miscible with water in all proportions.

EXAMPLE 2

63 parts of melamine (0.5 mol) and 89.1 parts of 37% aqueous formaldehyde (1.1 mol) are mixed in a suitable reaction vessel. The pH of the mixture is adjusted to 6.7 with a small amount of potassium carbonate. The mixture is then allowed to react at 70° C. until the clear syrup begins to hydrophobe in 30° C. water. At this point a sample tested with an equal volume of 37% aqueous formaldehyde at 60° C. exhibits no insolubility. A second portion of 37% aqueous formaldehyde in an amount of 316 parts (3.9 mol) is immediately added, followed by 36.5 parts of triethylenetetramine (0.25 mol). The pH is adjusted to 4.7 with sufficient amount of hydrochloric acid. The viscosity of the batch begins to increase. The bath is held at 55° C.; and when the Gardner-Holdt viscosity of "Y" measured at 25° C. is reached (approximately 3½ hours), the polymerization reaction is terminated by adjusting the pH to 7.0 with small amount of triethylenetetramine.

The resin is found to be very effective in improving both dry and wet strength of paper by beater addition.

EXAMPLE 3

A mixture of 63 parts of melamine (0.5 mol) and 142 parts of 37% aqueous formaldehyde (1.75 mol) having a slurry pH adjusted to 7.5 with barium hydroxide is heated at 90° C. until the condensation product begins to hydrophobe in a 30% aqueous potassium chloride solution at 0° C. When a sample of the condensation product at this stage is tested with an equal volume of 37% aqueous formaldehyde at 60° C., it is completely soluble. A second portion of 37% aqueous formaldehyde in an amount of 344 parts (4.25 mols) is immediately added, followed by 39.86 parts of tetraethylenepentamine (0.20 mol). A sufficient amount of hydrochloric acid is added to adjust the pH to 5.5. Polymerization proceeds smoothly at 65° C.; after 1½ hours a Gardner-Holdt viscosity of "E" is reached. The polymerization reaction is terminated by adjusting the pH of 7.4 with a small amount of triethanolamine.

As has been stated, in practicing the process of our invention after the polymerization has progressed just beyond the methylol stage, it is necessary that additional amounts of formaldehyde be added to the reaction mixture until a total molar ratio of formaldehyde to melamine is more than 6:1 but less than 14:1, respectively. The polyfunctional polyamine is added and polymerization then allowed to proceed to the desired degree; then, more formaldehyde may be added to stabilize the resin after the end point. It will be understood that where there is already present 8 mols or more of formaldehyde before the end point, i. e., during the second stage, it may be advantageous to increase the formaldehyde content; but this is not essential providing there is present at least 8 mols of formaldehyde per mol of melamine in the final reaction product. No fixed maximum ratio of formaldehyde need be set, although a practical upper limit will necessarily be reached. As heretofore stated, it is preferable that a total amount of from at least 8 mols of formaldehyde per mol of melamine to about 30 mols of formaldehyde per mol of melamine be employed in the preparation of the resinous product.

We have found that the resin of the present invention has superior properties and good stability when it has a total formaldehyde content of at least 8 mols and preferably lies in the range of 8–30 mols of formaldehyde per mol of melamine.

It will be apparent that the partially polymerized condensation product used in making the water-soluble melamine-formaldehyde resinous compositions with polyalkylene-polyamine may be either prepared to the partially polymerized state as herein described, or it is, of course, possible to apply the teaching of the instant invention to a material in the partially polymerized state which have been obtained commercially. It is only necessary that the melamine-formaldehyde ratio of the partially polymerized condensation product be within the range of 1:1.5 to 1:5 and that the material satisfy the requirement that it be reacted beyond the methylol stage but just short of the gel point, as heretofore defined.

The polyfunctional aliphatic polyamines that may be utilized in the production of the resinous compositions are the alkylene polyamines such as ethylenediamine, trimethylenediamine, tetramethylene-diamine, propylenediamine (1,2-diaminopropane); polyalkylene-polyamines, diethylenetriamine, triethylenetetramine, tetraethylenepentamine, 3,3'-iminobispropylamine, tris-(3-aminopropyl)amine, and the like. Hydroxylpolyamines may also be utilized in the preparation of the resinous material, examples of which are N,N-(2-hydroxyethyl-2'-aminoethyl)amine, N,N-(3-hydroxypropyl - 3' - aminopropyl)-amine, and the like. Other polyfunctional aliphatic polyamines which are adaptable for use in the preparation of the resinous composition of our invention are guanidine compounds such as guanidine hydrochloride, guanidine nitrate, guanidine acetate, guanidine carbonate, guanidine biguanide, and the like.

The amount of polyfunctional aliphatic polyamine employed in the preparation of the resinous material may vary over rather wide limits. From about 0.5 atom of basic nitrogen present in the polyfunctional aliphatic polyamine per mol of melamine to about 10 atoms of basic nitrogen present in the polyfunctional aliphatic polyamines per mol of melamine may be used. It is preferred, however, that from about 1–4 atoms of basic nitrogen in the polyfunctional aliphatic polyamine be utilized per mol of melamine present. The particular polyfunctional aliphatic polyamine should be so selected that the carbon to nitrogen ratio present is not greater than 4:1. We have found that a carbon to nitrogen ratio greater than this is detrimental to the water-solubility of the resinous product.

Resins prepared as set forth above were tested as wet strength paper resins utilizing the resin of Example 1 according to the following procedure:

Hand sheets were made on a Nash machine with Canadian bleached kraft pulp beaten to a Green freeness of about 500. The solids content of the syrup was determined by the Plastic Materials Manufacturers Association method. The amount of resin applied as a modifier for paper generally varies from 0.1–10 parts resin based on 100 parts of dry pulp. Usually, however, as employed in the present tests, either 1 part or 3 parts of resin solids per 100 quarts of dry pulp is added. It will be apparent that a particular application may warrant a greater or less proportion. The pH of the pulp slurry was adjusted to 4.5. After the hand sheets were made, they were dried at 240° F. for 2 minutes. The tests results are set forth in the table below.

Table

|  | Basis Wt. (lbs.) 25 x 40/500 | Dry Tensile (#/in.) | Wet Tensile (#/in.) |
| --- | --- | --- | --- |
| Blank | 43.7 | 24.6 | nil |
| 1% Resin | 46.4 | 32.3 | 6.1 |
| 3% Resin | 47.2 | 33.4 | 9.4 |

The application is a continuation-in-part of our copending application Serial No. 343,791, filed March 20, 1953.

Attention is directed to our copending application Serial No. 520,359, filed concurrently herewith wherein resinous compositions and process of preparing same which comprises reacting a partially polymerized melamine, formaldehyde, and a polyfunctional aliphatic polyamine condensation product is disclosed and claimed.

What we claim is:

1. The process of preparing a water-soluble resinous material comprising the reaction product of melamine, formaldehyde and a polyfunctional aliphatic polyamine wherein the formaldehyde is present in a total amount of at least 8 mols per mol of melamine which comprises treating a partially polymerized melamine-formaldehyde condensation product having a melamine to formaldehyde mol ratio of from about 1:1.5 to 1:5, respectively, at a temperature between about 20° C. and 100° C. with a polyfunctional aliphatic polyamine providing a carbon to nitrogen ratio not greater than 4:1, respectively, in an amount sufficient to yield between about 0.5–10 atoms of nitrogen per mol of melamine; introducing formaldehyde until the mol ratio of melamine to formaldehyde lies within the range of from 1:6 to 1:15, respectively; reacting the mixture until an end point viscosity of between about 20 centipoises and 800 centipoises measured at 35% solids and 25° C. is obtained; inhibiting further reaction by substantially neutralizing the polymerized product and adding to the reaction product additional formaldehyde in an amount sufficient to bring the mol ratio of the melamine to total formaldehyde charged to at least 1:8, respectively.

2. The process of preparing a water-soluble resinous material comprising the reaction product of melamine, formaldehyde and a polyalkylene polyamine wherein the formaldehyde is present in a total amount of between 8 and 30 mols per mol melamine which comprises treating a partially polymerized melamine-formaldehyde condensation product having a melamine to formaldehyde ratio of from about 1:2 to 1:4, respectively, at a temperature of between about 20° C. and 100° C. with a polyalkylene polyamine providing a carbon to nitrogen ratio not greater than 4:1, respectively, in an amount sufficient to yield between 1–4 atoms of nitrogen per mol of melamine; introducing formaldehyde until the mol ratio of melamine to formaldehyde lies within the range of 1:6 to 1:14, respectively; reacting the mixture until an end point viscosity of between about 20 centipoises and 800 centipoises measured at 35% solids and 25° C. is obtained; inhibiting further reaction by substantially neutralizing the polymerized product, and adding to the reaction product additional formaldehyde in an amount sufficient to bring the total mol ratio of melamine to formaldehyde charged to between 1:8 and 1:30, respectively.

3. The process of preparing a water-soluble resinous material comprising the reaction product of melamine, formaldehyde and a polyfunctional aliphatic polyamine wherein the formaldehyde is present in a total amount of at least 8 mols per mol of melamine which comprises making a partially polymerized condensation product by reacting melamine and formaldehyde in the ratio of from 1:1.5 to 1:5, respectively, to a point beyond the methylol stage but short of the gel stage; thereafter adding a polyfunctional aliphatic polyamine providing a carbon to nitrogen ratio not greater than 4:1, respectively, in an amount sufficient to yield 0.5–10 atoms of nitrogen per mol of melamine; introducing additional amounts of formaldehyde until the molar ratio of melamine to formaldehyde lies with the range of 1:6 to 1:14, respectively; continuing the reaction until an end point viscosity of between about 20 centipoises and 800 centipoises measured at 35% solids and 25° C. is obtained; inhibiting further reaction by substantially neutralizing the polymerized product and adding to the reaction product additional formaldehyde in an amount sufficient to bring the total mol ratio of melamine to formaldehyde charged to at least 1:8, respectively.

4. The process of preparing a water-soluble resinous material comprising the reaction product of melamine, formaldehyde and a polyfunctional aliphatic polyamine wherein the formaldehyde is present in a total amount of between 8 and 30 mols per mol of melamine which comprises making a partially polymerized condensation product by reacting melamine and formaldehyde in the ratio of 1:2 to 1:4, respectively, at a temperature between about 20° C. and 100° C., to a point beyond the methylol stage but short of the gel point; thereafter adding a polyfunctional aliphatic polyamine providing a carbon to nitrogen ratio not greater than 4:1, respectively, in an amount sufficient to yield between about 1–4 atoms of nitrogen per mol of melamine; introducing additional amounts of formaldehyde until the mol ratio of melamine to formaldehyde lies within the range of 1:6 to 1:14, respectively; continuing the reaction until an end point viscosity of between about 20 centipoises and 800 centipoises measured at 35% solids and 25° C. is obtained; inhibiting further reaction by substantially neutralizing the polymerized product, and adding to the reaction product additional formaldehyde in an amount sufficient to bring the total mol ratio of melamine to formaldehyde charged to between 1:8 and 1:30, respectively.

5. The process of preparing a water-soluble resinous material comprising the reaction product of melamine, formaldehyde and a polyalkylene polyamine wherein the formaldehyde is present in a total amount of at least 8 mols per mol of melamine which comprises making a partially polymerized condensation product by reacting melamine with formaldehyde in the ratio of 1:1.5 to 1:5, respectively, at a temperature between about 20° C. and 100° C. to a point beyond the methylol stage but short of the gel point; thereafter adding a polyalkylene polyamine providing a carbon to nitrogen ratio not greater than 4:1, respectively, in an amount sufficient to yield between about 0.5–10 atoms of nitrogen per mol of melamine; introducing additional amounts of formaldehyde until the mol ratio of melamine to formaldehyde lies within the range of from 1:6 to 1:14, respectively, continuing the reaction until a viscosity of between about 20 centipoises and 800 centipoises measured at 35% solids and 25° C. is obtained; inhibiting further reaction by substantially neutralizing the polymerized product, and adding to the reaction product additional formaldehyde in an amount sufficient to bring the total mol ratio of melamine to formaldehyde charged to at least 1:8, respectively.

6. The process of preparing a water-soluble resinous material comprising the reaction product of melamine, formaldehyde and a polyalkylene polyamine wherein the formaldehyde is present in a total amount of between 8 and 30 mols per mol of melamine which comprises making a partially polymerized condensation product by reacting melamine and formaldehyde in the ratio of 1:2 to 1:4, respectively, at a temperature between about 20° C. and 100° C. to a point beyond the methylol stage but short of the gel point; thereafter adding a polyalkylene polyamine providing a carbon to nitrogen ratio not greater than 4:1, respectively, in an amount sufficient to yield between about 1–4 atoms of nitrogen per mol of melamine; introducing additional amounts of formaldehyde until the mol ratio of melamine to formaldehyde lies within the range of 1:6 to 1:14, respectively; continuing the reaction until an end point viscosity between about 20 centipoises and 800 centipoises measured at 35% solids and 25° C. is obtained; substantially neutralizing the polymerized product, and adding to the reaction product additional formaldehyde in an amount sufficient to bring the total mol ratio of melamine to formaldehyde charged to between 1:8 and 1:30, respectively.

7. The process of preparing a water-soluble resinous material comprising the reaction product of melamine, formaldehyde and 3,3'-iminobispropylamine wherein the formaldehyde is present in a total amount of at least 8 mols per mol of melamine which comprises making a partially polymerized condensation product by reacting melamine and formaldehyde in the ratio of 1:1.5 to 1:5, respectively, at a temperature of between about 20° C.

and 100° C. to a point beyond the methylol stage but short of the gel point; thereafter adding 3,3'-iminobispropylamine in an amount sufficient to yield between about 0.5–10 atoms of nitrogen per mol of melamine; introducing additional amounts of formaldehyde until the mol ratio of melamine to formaldehyde lies within the range of 1:6 to 1:14, respectively; continuing the reaction until a viscosity of between about 20 centipoises and 800 centipoises measured at 35% solids and 25° C. is obtained; inhibiting further reaction of the polymerized product, and adding to the reaction product additional formaldehyde in an amount sufficient to bring the total mol ratio of melamine to formaldehyde charged to at least 1:8, respectively.

8. The process of preparing a water-soluble resinous material comprising the reaction product of melamine, formaldehyde and 3,3'-iminobispropylamine wherein the formaldehyde is present in a total amount of between about 8 and 30 mols per mol of melamine which comprises making a partially polymerized condensation product by reacting melamine and formaldehyde in the ratio of 1:2 to 1:4, respectively, at a temperature of between about 20° C. and 100° C. to a point beyond the methylol stage but short of the gel point; thereafter adding 3,3'-iminobispropylamine in an amount sufficient to yield between 1–4 atoms of nitrogen per mol of melamine; introducing additional amounts of formaldehyde until the mol ratio of melamine to formaldehyde lies within the range of from 1:6 to 1:14, respectively, continuing the reaction until an end point viscosity of between about 20 centipoises and 800 centipoises measured at 35% solids and 25° C. is obtained; inhibiting further reaction by substantially neutralizing the polymerized product, and adding to the reaction product additional formaldehyde in an amount sufficient to bring the total mol ratio of melamine to formaldehyde charged to between 1:8 and 1.30, respectively.

9. The process of preparing a water-soluble resinous material comprising the reaction product of melamine, formaldehyde and triethylenetetramine wherein the formaldehyde is present in a total amount of at least 8 mols per mol of melamine which comprises making a partially polymerized condensation product by reacting melamine and formaldehyde in the ratio of 1:1.5 to 1:5, respectively, at a temperature of between about 20° C. and 100° C. to a point beyond the methylol stage but short of the gel point; thereafter adding triethylenetetramine in an amount sufficient to yield between about 0.5–10 atoms of nitrogen per mol of melamine; introducing additional amounts of formaldehyde until the mol ratio of melamine to formaldehyde lies within the range of 1:6 to 1:14, respectively; continuing the reaction until an end point viscosity of between about 20 centipoises and 800 centipoises measured at 35% solids and 25° C. is obtained; inhibiting further reaction by substantially neutralizing the polymerized product, and adding to the reaction product additional formaldehyde in an amount sufficient to bring the total mol ratio of melamine to formaldehyde charged to at least 1:8, respectively.

10. The process of preparing a water-soluble resinous material comprising the reaction product of melamine, formaldehyde and tetraethylenepentamine wherein the formaldehyde is present in a total amount of at least 8 mols per mol of melamine which comprises making a partially polymerized condensation product by reacting melamine and formaldehyde in the ratio of 1:1.5 to 1:5, respectively, at a temperature between about 20° C. and 100° C. to a point beyond the methylol stage but short of the gel point; thereafter adding tetraethylenepentamine in an amount sufficient to yield between about 0.5–10 atoms of nitrogen per mol of melamine; introducing additional amounts of formaldehyde until the mol ratio of melamine to formaldehyde lies within the range of 1:6 to 1:14, respectively; continuing the reaction until an end point viscosity of between about 20 centipoises and 800 centipoises measured at 35% solids and 25° C. is obtained; inhibiting further reaction by substantially neutralizing the polymerized product, and adding to the reaction product additional formaldehyde in an amount sufficient to bring the total mol ratio of melamine to formaldehyde charged to at least 1:8, respectively.

11. The process of preparing a water-soluble resinous material comprising the reaction product of melamine, formaldehyde and diethylenetriamine wherein the formaldehyde is present in a total amount of at least 8 mols per mol of melamine which comprises making a partially polymerized condensation product by reacting melamine and formaldehyde in the ratio of 1:1.5 to 1:5, respectively, at a temperature of between 20° C. and 100° C. to a point beyond the methylol stage but short of the gel point; thereafter adding diethylenetriamine in an amount sufficient to yield between about 0.5–10 atoms of nitrogen per mol of melamine; introducing additional amounts of formaldehyde until the mol ratio of melamine to formaldehyde lies within the range of 1:6 to 1:14, respectively; continuing the reaction until an end point viscosity of between about 20 centipoises and 800 centipoises measured at 35% solids and 25° C. is obtained; inhibiting further reaction by substantially neutralizing the polymerized product, and adding to the reaction product additional formaldehyde in an amount sufficient to bring the total mol ratio of melamine to formaldehyde charged to at least 1:8, respectively.

12. The process of preparing a water-soluble resinous material comprising the reaction product of melamine, formaldehyde and N,N-(2-hydroxyethyl-2'-aminoethyl)-amine wherein the formaldehyde is present in a total amount of at least 8 mols per mol of melamine which comprises making a partially polymerized condensation product by reacting melamine and formaldehyde in the ratio of 1:1.5 to 1:5, respectively, at a temperature of between about 20° C. and 100° C. to a point beyond the methylol stage but short of the gel point; thereafter adding N,N-(2-hydroxyethyl-2'-aminoethyl)amine in an amount sufficient to yield between about 0.5–10 atoms of nitrogen per mol of melamine; introducing additional amounts of formaldehyde until the mol ratio of melamine to formaldehyde lies within the range of 1:6 to 1:14, respectively; continuing the reaction until an end point viscosity of between about 20 centipoises and 800 centipoises measured at 35% solids and 25° C. is obtained; inhibiting further reaction by substantially neutralizing the polymerized product, and adding to the reaction product additional formaldehyde in an amount sufficient to bring the total mol ratio of melamine to formaldehyde charged to at least 1:8, respectively.

No references cited.